United States Patent
Nakagawa

(10) Patent No.: US 12,449,535 B2
(45) Date of Patent: Oct. 21, 2025

(54) SHIP MONITORING SYSTEM, SHIP MONITORING METHOD, AND INFORMATION PROCESSING DEVICE

(71) Applicant: Furuno Electric Co., Ltd., Nishinomiya (JP)

(72) Inventor: Kazuya Nakagawa, Amagasaki (JP)

(73) Assignee: FURUNO ELECTRIC CO., LTD., Nishinomiya (JP)

( * ) Notice: Subject to any disclaimer, the term of this patent is extended or adjusted under 35 U.S.C. 154(b) by 259 days.

(21) Appl. No.: 18/201,765

(22) Filed: May 25, 2023

(65) Prior Publication Data

US 2023/0296766 A1    Sep. 21, 2023

Related U.S. Application Data

(63) Continuation-in-part of application No. PCT/JP2021/039312, filed on Oct. 25, 2021.

(30) Foreign Application Priority Data

Nov. 26, 2020 (JP) .................... 2020-195775

(51) Int. Cl.
*G01S 13/937* (2020.01)
*G01S 15/93* (2020.01)

(52) U.S. Cl.
CPC ............ *G01S 13/937* (2020.01); *G01S 15/93* (2013.01)

(58) Field of Classification Search
CPC ........ G01S 13/937; G01S 15/93; G01S 13/58; B63B 43/20; B63B 49/00; G08G 3/02
See application file for complete search history.

(56) References Cited

U.S. PATENT DOCUMENTS 6,249,241 B1 * 6/2001 Jordan .................. G01S 13/917
                                                                 342/41
7,548,194 B2 * 6/2009 Wood .................... G01S 13/726
                                                                 342/119
(Continued)

FOREIGN PATENT DOCUMENTS

JP    H08-189966 A    7/1996
JP    2006-216066 A    8/2006
(Continued)

OTHER PUBLICATIONS

International Search Report and Written Opinion mailed on Nov. 22, 2021, received for PCT Application PCT/JP2021/039312, filed on Oct. 25, 2021, 9 pages including English Translation.

*Primary Examiner* — Bhavesh V Amin
(74) *Attorney, Agent, or Firm* — XSENSUS LLP

(57) ABSTRACT

The present disclosure provides a ship monitoring system which makes it easy for a user to grasp a change in a risk situation. The ship monitoring system includes a first data generator, a second data generator, processing circuitry, and an alarm sounding part. The first data generator generates first ship data indicative of a position and a velocity of a first ship. The second data generator generates second ship data indicative of a position and a velocity of a second ship. The processing circuitry calculates a risk value indicative of a risk of a collision between the first ship and the second ship based on the first ship data and the second ship data. The processing circuitry generates a discontinuous sound pattern with an interval according to the risk value. The alarm sounding part sounds an alarm according to the discontinuous sound pattern.

10 Claims, 4 Drawing Sheets

(56) References Cited

U.S. PATENT DOCUMENTS

| | | | |
|---|---|---|---|
| 9,865,167 B1* | 1/2018 | Liang | G08G 1/16 |
| 10,192,449 B2* | 1/2019 | Suzuki | G08G 3/02 |
| 11,195,419 B2* | 12/2021 | Suzuki | G08G 3/02 |
| 11,788,925 B1* | 10/2023 | Hawkins | E01H 5/061 |
| | | | 702/34 |
| 2006/0290562 A1* | 12/2006 | Ehresman | G08G 3/02 |
| | | | 342/41 |
| 2007/0188734 A1* | 8/2007 | Waquet | G01S 17/93 |
| | | | 356/4.01 |
| 2008/0133131 A1* | 6/2008 | Poreda | G08G 3/02 |
| | | | 701/418 |
| 2008/0239608 A1* | 10/2008 | Yoshitomi | H02H 5/04 |
| | | | 361/103 |
| 2009/0059100 A1* | 3/2009 | Hamperl | H04N 9/8042 |
| | | | 348/837 |
| 2011/0210865 A1* | 9/2011 | Lee | G08G 3/02 |
| | | | 340/903 |
| 2012/0271538 A1* | 10/2012 | Lee | G08G 9/02 |
| | | | 701/117 |
| 2013/0041523 A1* | 2/2013 | Jensen | G08G 3/00 |
| | | | 701/1 |
| 2014/0180566 A1* | 6/2014 | Malhotra | G08G 3/02 |
| | | | 340/984 |
| 2016/0101838 A1* | 4/2016 | Kojima | B63B 49/00 |
| | | | 701/466 |
| 2017/0043848 A1* | 2/2017 | Rigdon | B63B 69/00 |
| 2017/0287340 A1* | 10/2017 | Suzuki | G08G 3/02 |
| 2019/0315482 A1* | 10/2019 | Gu | G05D 1/104 |
| 2021/0107505 A1* | 4/2021 | Matsunaga | G01S 15/931 |
| 2021/0192931 A1* | 6/2021 | Bart | B64D 47/06 |
| 2021/0197846 A1* | 7/2021 | Thakur | B60Q 1/545 |
| 2022/0259802 A1* | 8/2022 | Demler | D21B 1/32 |

FOREIGN PATENT DOCUMENTS

| | | |
|---|---|---|
| JP | 2009-037445 A | 2/2009 |
| JP | 2020-095333 A | 6/2020 |
| WO | 2019/031284 A1 | 2/2019 |

* cited by examiner

OTHER SHIPS MANAGEMENT DATABASE

| OTHER SHIPS IDENTIFIER | POSITION | VELOCITY | | ... |
| --- | --- | --- | --- | --- |
| | | SPEED | BEARING | |
| 001 | x1,y1 | v1 | d1 | ... |
| 002 | x2,y2 | v2 | d2 | ... |
| 003 | x3,y3 | v3 | d3 | ... |

| MEETING RELATIONSHIP | ALARM SOUND |
|---|---|
| CROSSING FROM STARBOARD | PI, PI, PI (3 CONTINUOUS SOUNDS) |
| CROSSING FROM PORT SIDE | PI, PI (2 CONTINUOUS SOUNDS) |
| HEAD-ON | PI (SINGLE SOUND) |
| OVERTAKING | PI (SINGLE SOUND) |
| OVERTAKEN | PI (SINGLE SOUND) |

FIG. 8

SHIP MONITORING SYSTEM, SHIP MONITORING METHOD, AND INFORMATION PROCESSING DEVICE

CROSS-REFERENCE TO RELATED APPLICATION(S)

This application is a continuation-in-part application of PCT International Application No. PCT/JP2021/039312, which was filed on Oct. 25, 2021, and which claims priority to Japanese Patent Application No. JP2020-195775 filed on Nov. 26, 2020, the entire disclosures of each of which are herein incorporated by reference for all purposes.

TECHNICAL FIELD

The present disclosure relates to a ship monitoring system, a ship monitoring method, an information processing device, and a program.

BACKGROUND ART

Conventionally, in a ship collision alert, when a distance and a time of CPA (Closest Point of Approach) which are calculated based on a relative velocity vector with respect to a target object detected by a radar etc. exceed given thresholds, alarm sounding and indication are started.

REFERENCE DOCUMENT(S) OF CONVENTIONAL ART

Patent Document

[Patent Document 1] WO2019/031284A1

DESCRIPTION OF THE DISCLOSURE

Problem(s) to be Solved by the Disclosure

Meanwhile, in the conventional ship collision alert, since the alarm will not change even if the risk situation changes, it is difficult for a user to grasp the change in the risk situation.

Note that Patent Document 1 discloses a technique for reducing an interval of the alarm as a distance from an automobile to a target object which is detected by an ultrasonic sensor decreases. However, although this technique assumes a very short distance, in the ship field, since the monitoring range is huge and it is necessary to calculate a risk while taking a prospective state into consideration, the necessary processing configurations are different.

The present disclosure is made in view of the above-described problem, and a main purpose thereof is to provide a ship monitoring system, a ship monitoring method, an information processing device, and a program, which make it easy for a user to grasp a change in a risk situation.

SUMMARY OF THE DISCLOSURE

In order to solve the above-described problem, a ship monitoring system according to one aspect of the present disclosure includes a first data generator, a second data generator, a risk value calculator, a pattern generator, and an alarm sounding part. The first data generator generates first ship data indicative of a position and a velocity of a first ship. The second data generator generates second ship data indicative of a position and a velocity of a second ship. The risk value calculator calculates a risk value indicative of a risk of a collision between the first ship and the second ship based on the first ship data and the second ship data. The pattern generator generates a discontinuous sound pattern with an interval according to the risk value. The alarm sounding part sounds an alarm according to the discontinuous sound pattern.

Further, a ship monitoring method according to another aspect of the present disclosure includes generating, by a first data generator, first ship data indicative of a position and a velocity of a first ship, generating, by a second data generator, second ship data indicative of a position and a velocity of a second ship, calculating a risk value indicative of a risk of a collision between the first ship and the second ship based on the first ship data and the second ship data, generating a discontinuous sound pattern with an interval according to the risk value, and sounding an alarm according to the discontinuous sound pattern.

Further, an information processing device according to another aspect of the present disclosure includes a risk value calculator, a pattern generator, and an alarm sounding part. The risk value calculator calculates a risk value indicative of a risk of a collision between a first ship and a second ship based on first ship data indicative of a position and a velocity of the first ship, and second ship data indicative of a position and a velocity of the second ship. The pattern generator generates a discontinuous sound pattern with an interval according to the risk value. The alarm sounding part sounds an alarm according to the discontinuous sound pattern.

Further, a program according to another aspect of the present disclosure causes a computer to perform processing which includes calculating a risk value indicative of a risk of a collision between a first ship and a second ship based on first ship data indicative of a position and a velocity of the first ship, and second ship data indicative of a position and a velocity of the second ship, generating a discontinuous sound pattern with an interval according to the risk value, and sounding an alarm according to the discontinuous sound pattern.

Effect of the Disclosure

According to the present disclosure, it becomes easy for a user to grasp a change in the risk situation.

BRIEF DESCRIPTION OF DRAWINGS

FIG. 8 is a view illustrating one example of the discontinuous sound pattern according to a meeting relationship.

MODE FOR CARRYING OUT THE DISCLOSURE

Hereinafter, one embodiment of the present disclosure is described with reference to the drawings.

Figures 1, 2:
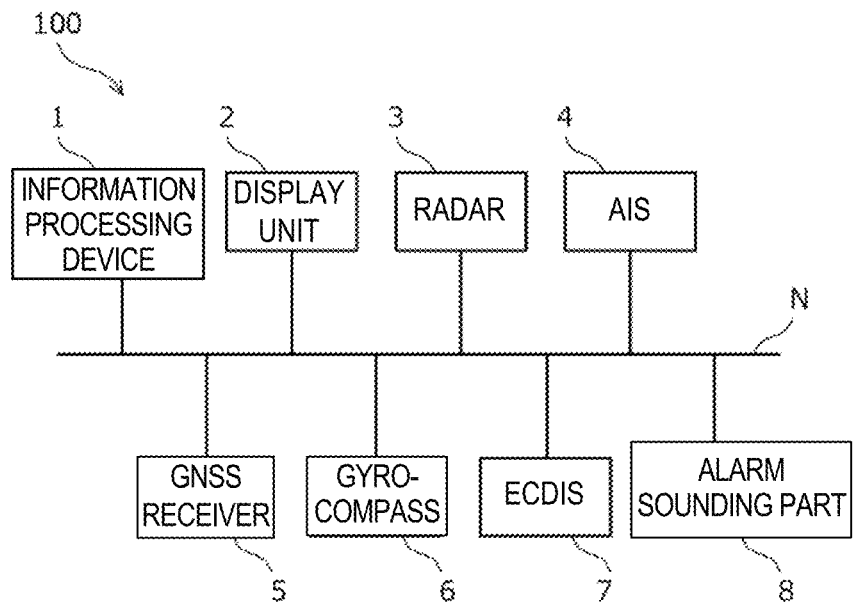
FIG. 1 is a view illustrating one example of a configuration of a ship monitoring system according to one embodiment.
FIG. 2 is a view illustrating one example of an other ships management database.

FIG. 1 is a block diagram illustrating one example of a configuration of a ship monitoring system 100 according to one embodiment. A ship monitoring method according to one embodiment may be implemented in the ship monitoring system 100. The ship monitoring system 100 may be a system which is mounted on a ship and monitors ships which exist therearound.

The ship on which the ship monitoring system 100 is mounted is one example of a first ship, and is referred to as "the ship" in the following description. Further, ship(s) which exists around the ship is one example of second ship(s), and is referred to as "another ship" or "other ships" in the following description.

Moreover, in the following description, a "velocity" is a vector quantity (so-called "ship velocity vector") indicative of a speed and a direction, and a "speed" is a scalar quantity.

The ship monitoring system 100 may include an information processing device 1, a display unit 2, a radar 3, an AIS 4, a GNSS receiver 5, a gyrocompass 6, an ECDIS 7, and an alarm part 8. These apparatuses may be connected to a network N (for example, LAN), so that mutual network communications are possible.

The information processing device 1 may be a computer including processing circuitry 10, a CPU, a RAM, a ROM, a nonvolatile memory, and an input/output interface. The CPU of the information processing device 1 may perform information processing according to a program loaded to the RAM from the ROM or the nonvolatile memory.

For example, the program may be supplied via an information storage medium, such as an optical disc or a memory card, or may be supplied via a communication network, such as the Internet or LAN.

For example, the display unit 2 is a display device with a touch sensor. The touch sensor may detect a position in a screen specified by a finger etc. Without being limited to the touch sensor, the specified position may be inputted by a trackball etc.

The radar 3 may transmit a radio wave around the ship, receive a reflection wave thereof, and generate echo data based on the reception signal. The radar 3 may discriminate a target object from the echo data, and generate Target Tracking data (TT data) indicative of a position and a velocity of the target object.

The AIS (Automatic Identification System) 4 may receive AIS data from another ship or a land control which exists around the ship. Without being limited to the AIS, a VDES (VHF Data Exchange System) may also be used. The AIS data may include a position, a velocity, etc. of another ship.

The GNSS receiver 5 may detect a position of the ship based on the radio wave received from a GNSS (Global Navigation Satellite System). The gyrocompass 6 may detect the bearing (heading) of the ship. Without being limited to the gyrocompass, a GPS compass or a magnetic compass may also be used.

The ECDIS (Electronic Chart Display and Information System) 7 may acquire the position of the ship from the GNSS receiver 5, and display the position of the ship on an electronic nautical chart. Further, the ECDIS 7 may also display a scheduled route of the ship on the electronic nautical chart. Without being limited to the ECDIS, a GNSS plotter may also be used.

The alarm sounding part 8 may sound an alarm, when there is a risk of a collision between the ship and another ship. The alarm sounding part 8 may be a speaker, which sounds the alarm according to a sound signal outputted from the information processing device 1.

In this embodiment, the information processing device 1 may be an independent device. However, without being limited to this configuration, it may be integrated with another device, such as the ECDIS 7. That is, a functional part of the information processing device 1 may be implemented by another device, such as the ECDIS 7.

Further, although the display unit 2 is also an independent device, without being limited to this configuration, a display unit of another device, such as the ECDIS 7, may also be used as the display unit 2 which displays an image generated by the information processing device 1.

In this embodiment, a set of the GNSS receiver 5 and the ECDIS 7 is one example of a first data generator, which generates the-ship data indicative of the position and the velocity of the ship. In detail, the GNSS receiver 5 may detect the position of the ship, and the ECDIS 7 may detect the velocity of the ship based on a temporal change at the position of the ship.

Without being limited to this configuration, the velocity of the ship may be detected based on the heading of the ship detected by the gyrocompass 6, and a speed of the ship detected by a ship speed meter (not illustrated).

Further, the radar 3 or the AIS 4 is one example of a second data generator, which generates other-ships data indicative of a position and a velocity of another ship. In detail, the TT data generated by the radar 3 may correspond to the other-ships data. Further, the AIS data generated by the AIS 4 may also correspond to the other-ships data.

FIG. 2 is a view illustrating one example of the other ships management database established in the memory of the information processing device 1. The other-ships data generated by the radar 3 or the AIS 4 may be registered to the other ships management database.

The other ships management database may include fields, such as "other ships identifier," "position," "speed," and "bearing." Note that the position and the bearing of another ship which are detected by the radar 3 may be converted into a coordinate system which is the same as the GNSS.

Figure 3:
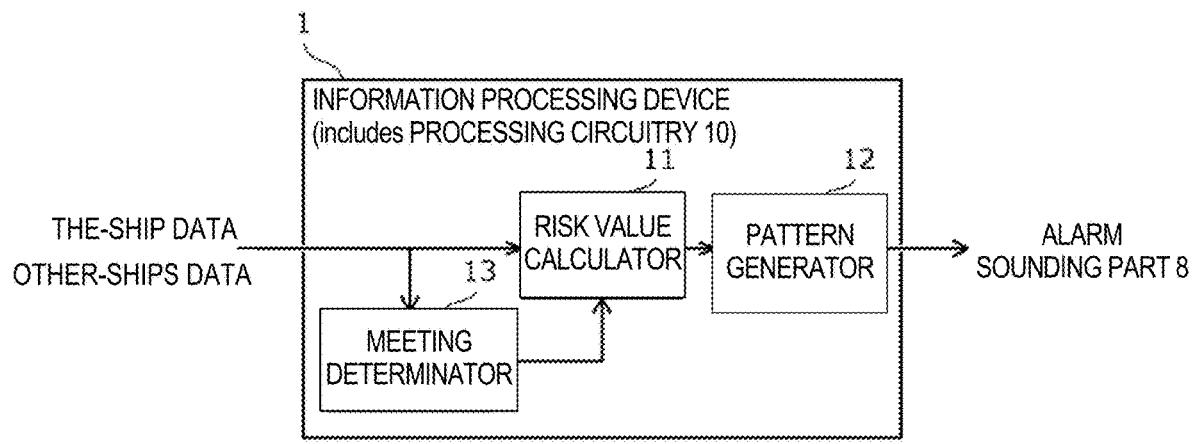
FIG. 3 is a view illustrating one example of a configuration of an information processing device according to one embodiment.

FIG. 3 is a view illustrating one example of a configuration of the information processing device 1 according to one embodiment. The processing circuitry 10 included in the information processing device 1 may include a risk value calculator 11, a pattern generator 12, and a meeting determinator 13. These functional parts may be realized by the CPU of the information processing device 1 performing information processing according to the program.

The risk value calculator 11 may calculate a risk value indicative of the risk of a collision between the ship and another ship based on the-ship data and other-ships data. The risk value may be calculated as a value which becomes higher as the possibility of a collision is higher and becomes lower as the possibility of a collision is lower.

For example, the risk value is calculated by a technique which uses TCPA (Time to Closest Point of Approach)/DCPA (Distance to Closest Point of Approach). Without being limited to this configuration, the risk value may be calculated, for example, by a technique which uses an SJ (Subject Judgment) value.

When the risk value calculated by the risk value calculator 11 is above a threshold, the pattern generator 12 may generate a discontinuous sound pattern for the alarm, and output a sound signal indicative of the discontinuous sound pattern to the alarm sounding part 8. The alarm sounding part 8 may sound the alarm according to the discontinuous sound pattern included in the sound signal.

When the risk value is calculated by the risk part calculator 11 for each of a plurality of other ships, the pattern generator 12 may generate the discontinuous sound pattern for another ship with the highest risk value. That is, the discontinuous sound pattern may be generated based on the highest risk value among a plurality of risk values.

In this embodiment, the pattern generator 12 may generate the discontinuous sound pattern with an interval according to the risk value. In detail, the pattern generator 12 may shorten the interval of the discontinuous sound pattern as the risk value becomes higher (i.e., as the possibility of a collision becomes higher), and it may lengthen the interval of the discontinuous sound pattern as the risk value becomes lower.

Figure 4:
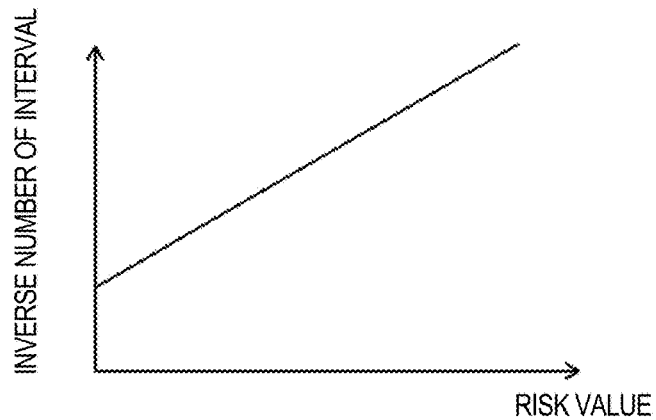
FIG. 4 is a view illustrating an example relationship between a risk value and an interval of a discontinuous sound pattern.
Figure 5:
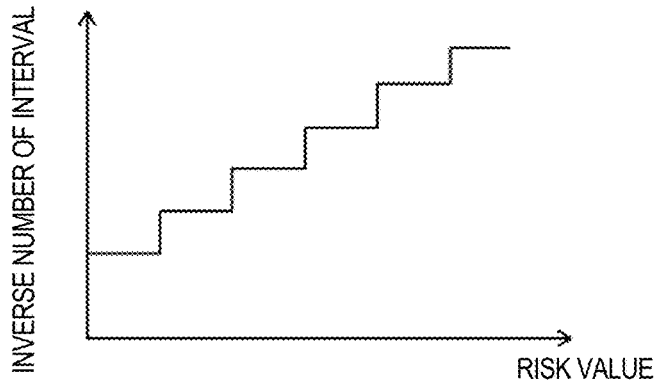
FIG. 5 is a view illustrating an example relationship between the risk value and the interval of the discontinuous sound pattern.

FIGS. 4 and 5 are views illustrating an example relationship between the risk value and the interval of the discontinuous sound pattern. The horizontal axis indicates the risk value, and the vertical axis indicates an inverse number of the interval (cycle). The pattern generator 12 may linearly change the interval of the discontinuous sound pattern according to the change in the risk value as illustrated in FIG. 4, or may stepwisely change the interval as illustrated in FIG. 5.

The pattern generator 12 may determine the interval of the discontinuous sound pattern corresponding to the risk value by using a function or a table defined beforehand.

Figure 6:
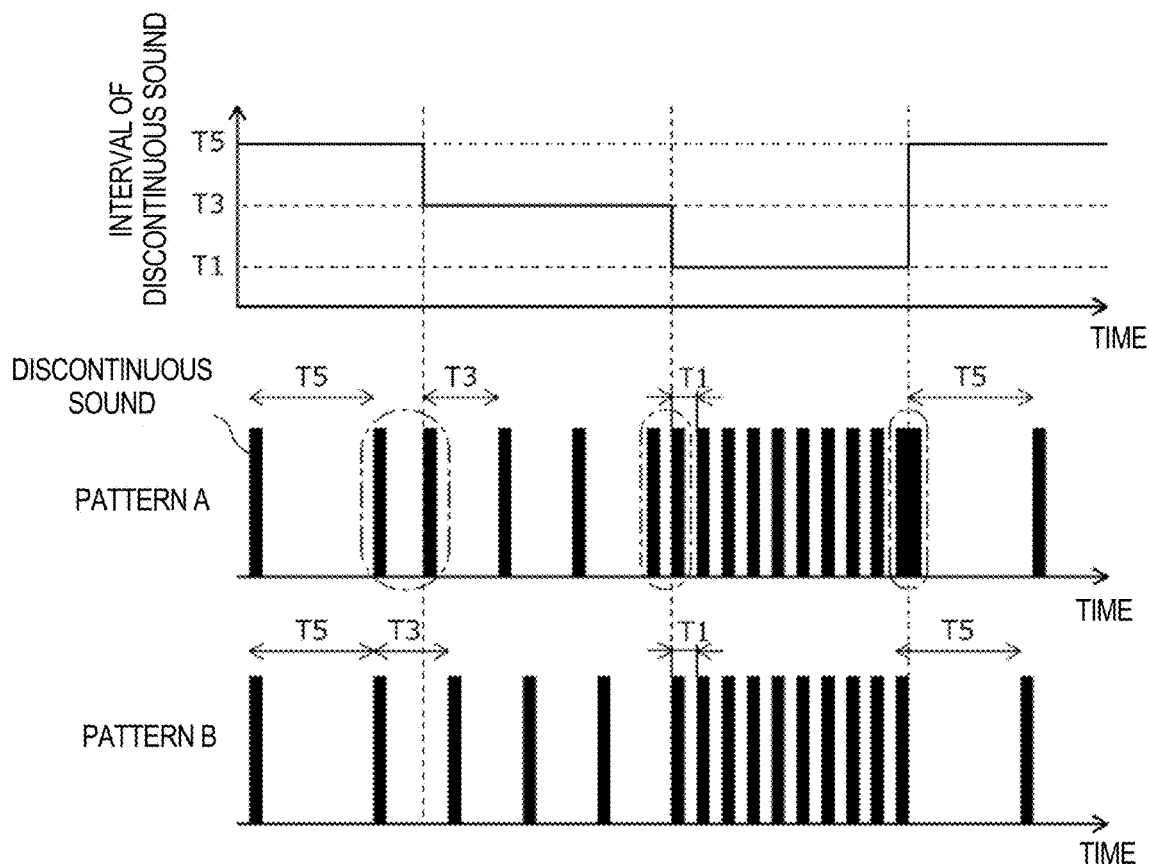
FIG. 6 is a view illustrating one example of the discontinuous sound pattern.

FIG. 6 is a view illustrating one example of the discontinuous sound pattern. The upper row of FIG. 6 is a view illustrating one example of a temporal change in the interval of the discontinuous sound pattern. The interval of the discontinuous sound pattern may be T1, T3, and T5 in an ascending order (i.e., as it becomes longer, or T1<T3<T5). A pattern A of the middle row and a pattern B of the bottom row of FIG. 6 indicates timings at which the discontinuous sounds appear.

As illustrated by the pattern A, when the sounding of the discontinuous sounds is started simply at the timing of changing the interval, a silent period from the discontinuous sound immediately before the change may become short, as in parts enclosed by a one-dot chain line in this drawing. Therefore, the user may recognize it as a discontinuous sound pattern with an interval shorter than the original interval.

Thus, in this embodiment, as illustrated by the pattern B, when changing the interval of the discontinuous sound pattern, the pattern generator 12 may dispose the first discontinuous sound when a lapsed time from the discontinuous sound immediately before the change reaches the interval after the change.

For example, when changing the interval of the discontinuous sound pattern from the interval T5 to the interval T3, the pattern generator 12 may dispose the first discontinuous sound of the interval T3 at a timing when the lapsed time from the discontinuous sound immediately before the change reaches the interval T3.

Further, when changing the interval of the discontinuous sound pattern from the interval T1 to the interval T5, the pattern generator 12 may dispose the first discontinuous sound of the interval T5 at a timing when the lapsed time from the discontinuous sound immediately before the change reaches the interval T5.

Note that, even if the interval of the discontinuous sound pattern is changed a plurality of times within a short period of time, the pattern generator 12 may continue counting the lapsed time from the last discontinuous sound, and when the lapsed time reaches the latest interval, it may then dispose the first discontinuous sound.

Returning to the description of FIG. 3, the meeting determinator 13 may determine a meeting relationship between the ship and another ship based on the-ship data and other-ships data. The pattern generator 12 may change the mode of the discontinuous sound pattern according to the meeting relationship determined by the meeting determinator 13.

Figure 7:
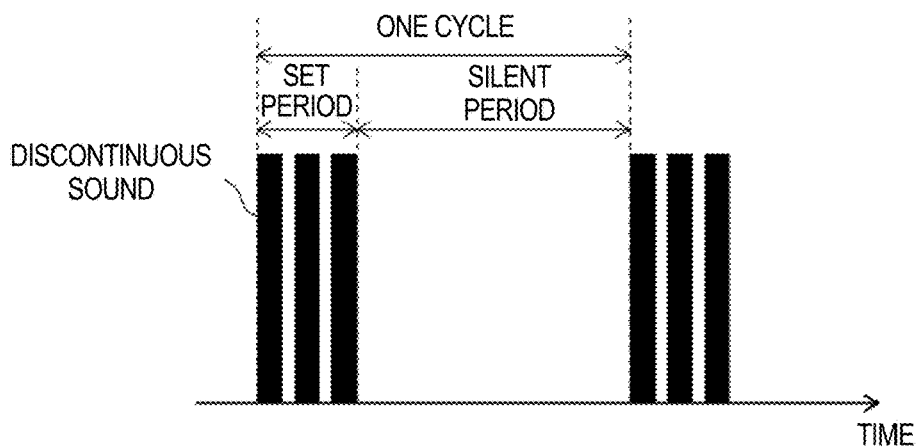
FIG. 7 is a view illustrating an example of one cycle of the discontinuous sound pattern.

FIG. 7 is a view illustrating an example of one cycle of the discontinuous sound pattern. The discontinuous sound pattern may include, in one cycle, a set period where one or more discontinuous sounds gather, and a silent period which does not include the discontinuous sound. The interval between the discontinuous sounds in the set period may be sufficiently smaller than the silent period.

In detail, the pattern generator 12 may change the number of discontinuous sounds included in the set period of the discontinuous sound pattern according to the meeting relationship determined by the meeting determinator 13. FIG. 7 illustrates a mode in which three discontinuous sounds are included in the set period (three continuous sounds).

FIG. 8 is a view illustrating one example of the discontinuous sound pattern according to the meeting relationship. The meeting relationship may include crossing from starboard, crossing from the port side, head-on, overtaking, and overtaken.

In the case of "crossing from starboard (i.e., when another ship crosses the course of the ship from starboard)," a mode in which three discontinuous sounds (three continuous sounds) are included in the set period may be applied.

In the case of "crossing from the port side (i.e., when another ship crosses the course of the ship from the port side)," a mode in which two discontinuous sounds (two continuous sounds) are included in the set period may be applied.

In the case of "head-on," "overtaking," and "overtaken," a mode in which one discontinuous sound (single sound) is included in the set period may be applied.

In this embodiment, in the cases of "crossing from starboard" and "crossing from the port side," the number of discontinuous sounds included in the set period of the discontinuous sound pattern may be increased to be more than in the cases of "head-on," "overtaking," and "overtaken" which are not the crossing relationships.

Further, in the case of "crossing from starboard," the number of discontinuous sounds included in the set period of the discontinuous sound pattern may be increased to be more than in the case of "crossing from the port side."

Note that the change in the mode of the discontinuous sound pattern is not limited to the change in the number of discontinuous sounds included in the set period. For example, the duration of the discontinuous sound(s) may be changed, or the intensity of the discontinuous sound(s) may be changed.

According to the above embodiment, since the pattern generator 12 generates the discontinuous sound pattern with the interval according to the risk value, it becomes easier for the user to grasp the change in the risk situation. Particularly, since the pattern generator 12 shortens the interval of the discontinuous sound pattern as the risk value becomes higher, the user can easily grasp that the risk of a collision is increased.

Further, according to the embodiment, upon changing the interval of the discontinuous sound pattern, the pattern generator 12 may dispose the first discontinuous sound when the lapsed time from the discontinuous sound immediately before the change reaches the interval after the change, and therefore, it is suppressed that the user recognizes it as a discontinuous sound pattern with an interval shorter than the original interval.

Further, according to the embodiment, since the pattern generator 12 changes the mode of the discontinuous sound pattern according to the meeting relationship, it becomes easier for the user to grasp not only the change in the risk situation but also the meeting relationship.

In detail, when the ship and another ship are in the crossing relationship, since the pattern generator 12 increases the number of discontinuous sounds included in the set period of the discontinuous sound pattern to be more than in the case where the ship and another ship are not in the crossing relationship, the user can easily grasp the high-risk meeting relationship.

Further, when another ship crosses the course of the ship from starboard, since the pattern generator 12 increases the number of discontinuous sounds included in the set period of the discontinuous sound pattern to be more than in the case where another ship crosses the course of the ship from the port side, the user can easily grasp that the ship is a give-way ship.

Although the embodiment of the present disclosure is described above, the present disclosure is not limited to the above embodiment, and it is needless to say that various changes are possible for a person skilled in the art.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

DESCRIPTION OF REFERENCE CHARACTERS

1 Information Processing Device, 2 Display Unit, 3 Radar, 4 AIS, 5 GNSS Receiver, 6 Gyrocompass, 7 ECDIS, 8 Alarm Sounding Part, 10 PROCESSING CIRCUITRY, 11 Risk Value Calculator, 12 Pattern Generator, 13 Meeting Determinator, 100 Ship Monitoring System

What is claimed is:

1. A ship monitoring system, comprising:
   a first data generator configured to generate first ship data indicative of a position and a velocity of a first ship;
   a second data generator configured to generate second ship data indicative of a position and a velocity of a second ship;
   processing circuitry configured to:
      calculate a risk value indicative of a risk of a collision between the first ship and the second ship based on the first ship data and the second ship data, and
      generate a discontinuous sound pattern with an interval according to the risk value, and
   an alarm configured to sound an alarm according to the discontinuous sound pattern,
   wherein the processing circuitry:
      determines a meeting relationship between the first ship and the second ship based on the first ship data and the second ship data, and
      changes a mode of the discontinuous sound pattern according to the meeting relationship,
   wherein the discontinuous sound pattern includes, in one cycle, a set period where there is one or more discontinuous sounds, and a silent period where there is no discontinuous sound, and
   wherein the processing circuitry changes a number of the one or more discontinuous sounds included in the set period according to the meeting relationship.

2. The ship monitoring system of claim 1, wherein the processing circuitry shortens the interval of the discontinuous sound pattern as the risk value becomes higher.

3. The ship monitoring system of claim 1, wherein, in a case where the processing circuitry changes the interval of the discontinuous sound pattern from a first interval to a second interval, the processing circuitry disposes a first discontinuous sound of the second interval, when a lapsed time from a discontinuous sound immediately before the change reaches the second interval.

4. The ship monitoring system of claim 1, wherein, based on the meeting relationship corresponding to a case where the first ship and the second ship are in a crossing relationship, the processing circuitry increases the number of discontinuous sounds included in the set period to be more than in a case where the first ship and the second ship are not in the crossing relationship.

5. The ship monitoring system of claim 1, wherein, based on the meeting relationship corresponding to a case where the second ship crosses a course of the first ship from the starboard, the pattern generator increases the number of discontinuous sounds included in the set period of to be more than in a case where the second ship crosses the course of the first ship from the port side.

6. The ship monitoring system of claim 4, wherein, when the second ship crosses the course of the first ship from the starboard, the pattern generator increases the number of discontinuous sounds included in the set period to be more than in a case where the second ship crosses the course of the first ship from the port side.

7. The ship monitoring system of claim 1, wherein the first data generator includes a Global Navigation Satellite System (GNSS) receiver mounted on the first ship and configured to detect the position of the first ship based on a radio wave received from a GNSS.

8. The ship monitoring system of claim 1, wherein the second data generator includes a radar mounted on the first ship and configured to detect the position and the velocity of the second ship from echo data generated by receiving a reflection wave of a radio wave transmitted around the first ship.

9. A ship monitoring method performed by a ship monitoring system, the method comprising:
   generating, by a first data generator of the ship monitoring system, first ship data indicative of a position and a velocity of a first ship;

generating, by a second data generator of the ship monitoring system, second ship data indicative of a position and a velocity of a second ship;

calculating, by processing circuitry of the ship monitoring system, a risk value indicative of a risk of a collision between the first ship and the second ship based on the first ship data and the second ship data;

generating, by the processing circuitry of the ship monitoring system, a discontinuous sound pattern with an interval according to the risk value; and controlling, by the processing circuitry of the ship monitoring system, an alarm to sound according to the discontinuous sound pattern, wherein the method further comprises:
determining, by the processing circuitry, a meeting relationship between the first ship and the second ship based on the first ship data and the second ship data, and
changing, by the processing circuitry, a mode of the discontinuous sound pattern according to the meeting relationship, wherein the discontinuous sound pattern includes, in one cycle, a set period where there is one or more discontinuous sounds, and a silent period where there is no discontinuous sound, and wherein the method further comprises changing, by the processing circuitry, a number of the one or more discontinuous sounds included in the set period according to the meeting relationship.

10. An information processing device, comprising:
processing circuitry configured to:
calculate a risk value indicative of a risk of a collision between a first ship and a second ship based on first ship data indicative of a position and a velocity of the first ship, and second ship data indicative of a position and a velocity of the second ship, and
generate a discontinuous sound pattern with an interval according to the risk value, and
an alarm configured to sound an alarm according to the discontinuous sound pattern,
wherein the processing circuitry:
determines a meeting relationship between the first ship and the second ship based on the first ship data and the second ship data, and
changes a mode of the discontinuous sound pattern according to the meeting relationship,
wherein the discontinuous sound pattern includes, in one cycle, a set period where there is one or more discontinuous sounds, and a silent period where there is no discontinuous sound, and
wherein the processing circuitry changes a number of the one or more discontinuous sounds included in the set period according to the meeting relationship.

* * * * *